United States Patent [19]

Stanton et al.

[11] 3,832,525
[45] Aug. 27, 1974

[54] AUTOMATIC HEATING DEVICE TO PREVENT FREEZING OF WATER SUPPLY LINES

[75] Inventors: Vernon W. Stanton; Ernest M. Shipley, both of Tucumcari, N. Mex.

[73] Assignee: The Raymond Lee Organization, Inc., New York, N.Y. ; a part interest

[22] Filed: Mar. 26, 1973

[21] Appl. No.: 344,778

[52] U.S. Cl.................. 219/301, 137/301, 137/338, 138/33, 219/369, 219/535
[51] Int. Cl............................................. F24h 1/00
[58] Field of Search........ 138/32, 33, 114; 137/301, 137/334, 338, 340, 341; 219/369, 370, 401, 535, 301, 373, 364

[56] References Cited
UNITED STATES PATENTS

| 70,365 | 10/1867 | Russell | 138/32 |
|---|---|---|---|
| 165,550 | 7/1875 | Dietz | 138/32 |
| 2,015,982 | 10/1935 | Witzel | 219/373 |
| 2,762,886 | 9/1956 | Visos | 219/364 |
| 3,356,824 | 12/1967 | Rossetti | 219/370 X |
| 3,626,987 | 12/1971 | Bittner | 138/114 |

FOREIGN PATENTS OR APPLICATIONS

| 52,518 | 12/1941 | Netherlands | 138/32 |

Primary Examiner—J. V. Truhe
Assistant Examiner—Clifford C. Shaw
Attorney, Agent, or Firm—Howard I. Podell

[57] ABSTRACT

Heating apparatus for protecting the external water lines of a mobile home from freezing. The apparatus consists of an insulated duct surrounding the external water line of a mobile home with means to continuously circulate hot air through said duct when the temperature threatens to approach the freezing level. A hot air blower powered by a fan that is driven by an electric motor blows hot air into one end of the duct housing and draws back cooled air from the other end of the duct housing. A pressure relief valve is mounted in the duct housing so as to equalize any difference between the external atmospheric pressure and the pressure of the air inside the duct.

2 Claims, 2 Drawing Figures

AUTOMATIC HEATING DEVICE TO PREVENT FREEZING OF WATER SUPPLY LINES

SUMMARY OF THE INVENTION

This invention relates to an apparatus for heating, by means of hot air, the external water pipe connections to a mobile home, and particularly to a device which is controlled thermostatically so as to respond automatically in freezing or near freezing conditions.

The advantage of this apparatus is that the water pipes connected to a mobile home are protected automatically regardless of the operating of the heating unit inside of the mobile home.

The apparatus consists of a duct about the water line connection from the external connection at the mobile home to the supply pipe, with an insulated housing mounted at each end of the duct that surrounds the water pipe. The blower and heating unit is mounted in a separate insulated housing with a duct leading from the exhaust end of the blower heater connected to the duct housing at the exterior of the mobile home, and with the intake of the blower connected by a duct to the housing at the water supply pipe so as to maintain continuous circulation of warm air about the water line. A pressure relief valve is mounted in the ducting, preferably in the housing surrounding the heating unit so as to equalize the pressure inside of the ducting to the atmospheric pressure. The device is thermostatically controlled to operate at temperatures approaching or below the freezing level.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
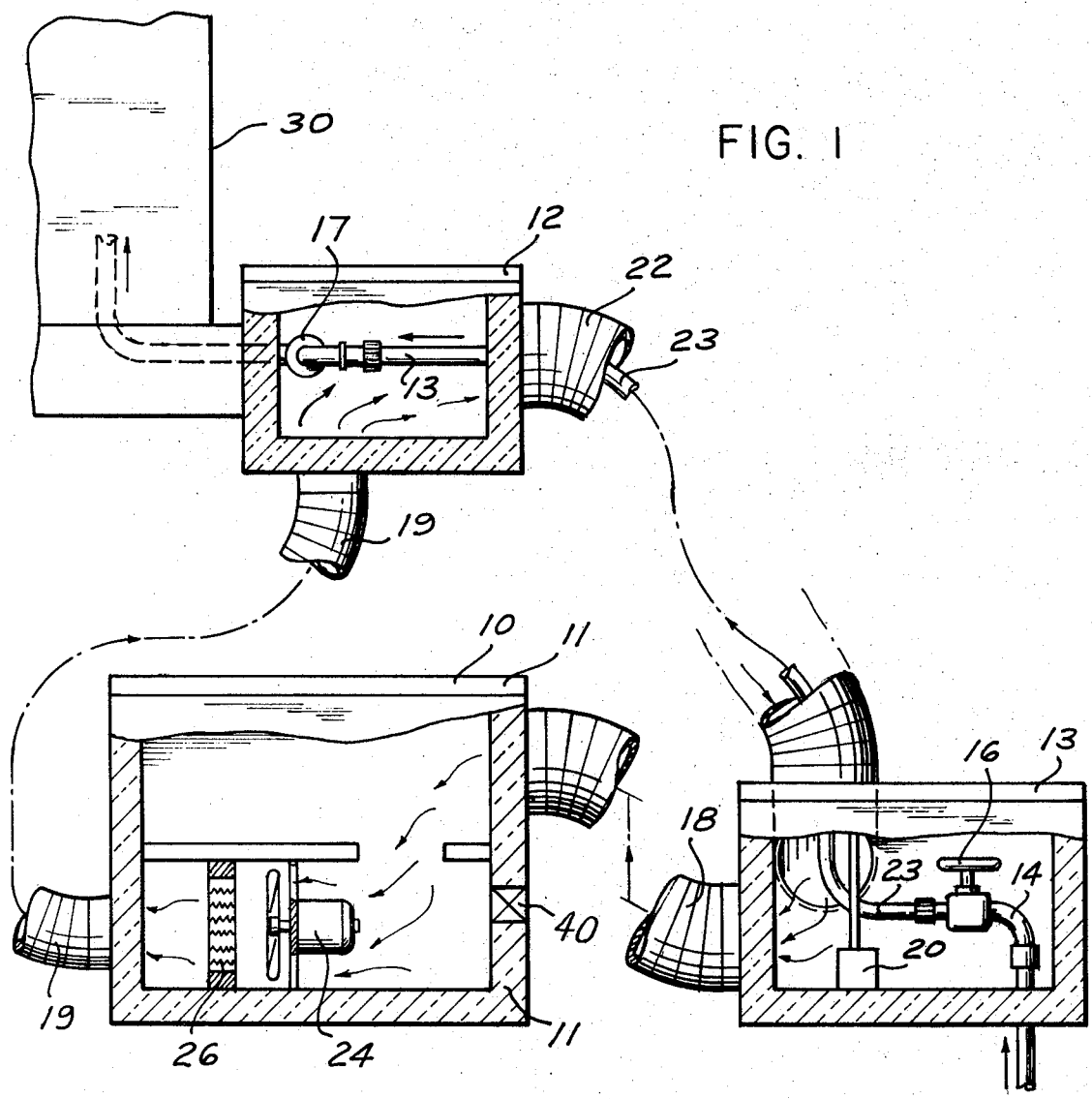
FIG. 1 is a schematic view of the apparatus installed.

Turning now descriptively to the drawings, in which similar reference characters denote similar elements throughout the several views, FIG. 1 illustrates the apparatus 10 with a box-like insulated housing 13 fitted about the external water supply pipe 14 and valve 16, and a similar insulated box-type housing fitted about the intake water valve 17 and associated pipe mounted on the exterior of the mobile home 30. An insulated plastic duct 22 leads between housing 12 and housing 13, protecting the plastic supply water pipe 23. An electrical heater element 26 is located in front of a blower 24 in an insulated housing 11. A flexible hose 19 leads from the interior of the housing 11 to the interior of housing 12 that surrounds the fixed piping and valve 17 on the exterior wall 30 of the mobile home. A hollow flexible duct 18 also joins the interior of the housing 13 surrounding the supply valve 16 and runs to the interior of the housing 11 in which the heater is mounted so that operation of the blower 24 and heater element 26 causes a continuous flow of re-circulated warm air to pass through duct 19 to the interior of housing 12 and then to flow through duct 22 about the flexible hose 23 carrying the water supply line. The recirculated air returns through housing 13, surrounding the supply valve 16, and through duct 18 back to the housing 11 for the reheating of the air.

A pressure relief valve 40 is mounted in the wall of housing 11 so as to equalize the air pressure of the closed heating system in the housings and ducts with the ambient atmospheric pressure and to compensate for differences caused by warming of the air inside of the system and by changes of the ambient atmospheric pressure.

Figure 2:
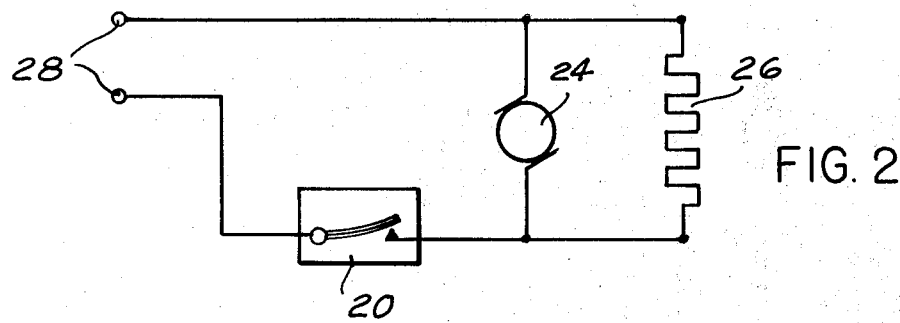
FIG. 2 is a schematic diagram of the electrical circuits of the apparatus.

A thermostat 20 is mounted in housing 13 surrounding the supply pipe 14 and is set to turn on the heating system at temperatures under 50 degrees or at such other temperature as may be recommended for the locality. As shown in FIG. 2 the thermostat 20 is in series with the fan motor 24 and the heating elements 26. The supply line connection 28 leads to a power supply of either 12 volts DC or 110 volts AC, depending on the components used and the available power supply.

The ducting may be fabricated of a foam plastic material, for optimum heat insulation and minimum cost and weight.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what we claim as new and desire to secure by letters Patent of the United States is:

1. An apparatus for preventing the freezing of the water supply pipe leading to a mobile home from a water supply main where the mobile home is fitted with a water intake pipe mounted on the exterior of a wall of the mobile home and the water supply main is fitted with a fixed outlet connection which is joined to the said water intake pipe by a water supply pipe, said apparatus comprising a motorized blower and electrical heater unit fitted with an intake duct which draws air into the said blower and heater unit, an exhaust duct through which heated air is blown out of the blower and heater unit, and fan and heating means for forcing the flow of air from the intake duct out through the exhaust duct, and an insulated duct mounted about the said water supply pipe, with one end of the said insulated duct joined to the intake duct of the blower and heater unit, and the other end of the said insulated duct joined to the exhaust duct of the said blower and heater unit so that heated air is recirculated by the blower and heater unit through the insulated duct to warm the water supply pipe, said insulated duct being structurally weak and said insulated duct being deformable when subjected to an internal pressure which differs substantially from the ambient air pressure external to the duct, said apparatus fitted with a pressure equalizing valve joined to both the air inside the insulated duct and to the ambient air outside of the insulated duct so as to equalize the air pressure of the air inside the insulated duct with the air pressure of the ambient air outside the apparatus, despite the effect of the blower and heater unit on the recirculated air.

2. The combination as recited in claim 1, in which a hollow insulated housing is mounted about the outlet connection of the water supply main, and a hollow insulated housing is mounted about the intake pipe mounted on the exterior wall of the mobile home, with the insulated duct joining the interior of the two said insulated hollow housings.

* * * * *